ECHO SUPPRESSOR

Filed Dec. 6, 1961 5 Sheets-Sheet 1

INVENTORS
LARRY C. HUNTER
BY JAMES A. STEWART
ATTORNEY

INVENTORS
LARRY C. HUNTER
BY JAMES A. STEWART
Theodore Jay
ATTORNEY

INVENTORS
LARRY C. HUNTER
JAMES A. STEWART
BY
ATTORNEY

INVENTOR
LARRY C. HUNTER
BY JAMES A. STEWART
ATTORNEY

ECHO SUPPRESSOR

Filed Dec. 6, 1961 5 Sheets-Sheet 5

INVENTORS
LARRY C. HUNTER
BY JAMES A. STEWART
ATTORNEY 3,215,789

ECHO SUPPRESSOR

Larry C. Hunter, Palo Alto, and James A. Stewart, Redwood City, Calif., assignors to General Telephone and Electronics Laboratories, Inc., a corporation of Delaware Filed Dec. 6, 1961, Ser. No. 157,365
5 Claims. (Cl. 179—170.6)

Figure 1:
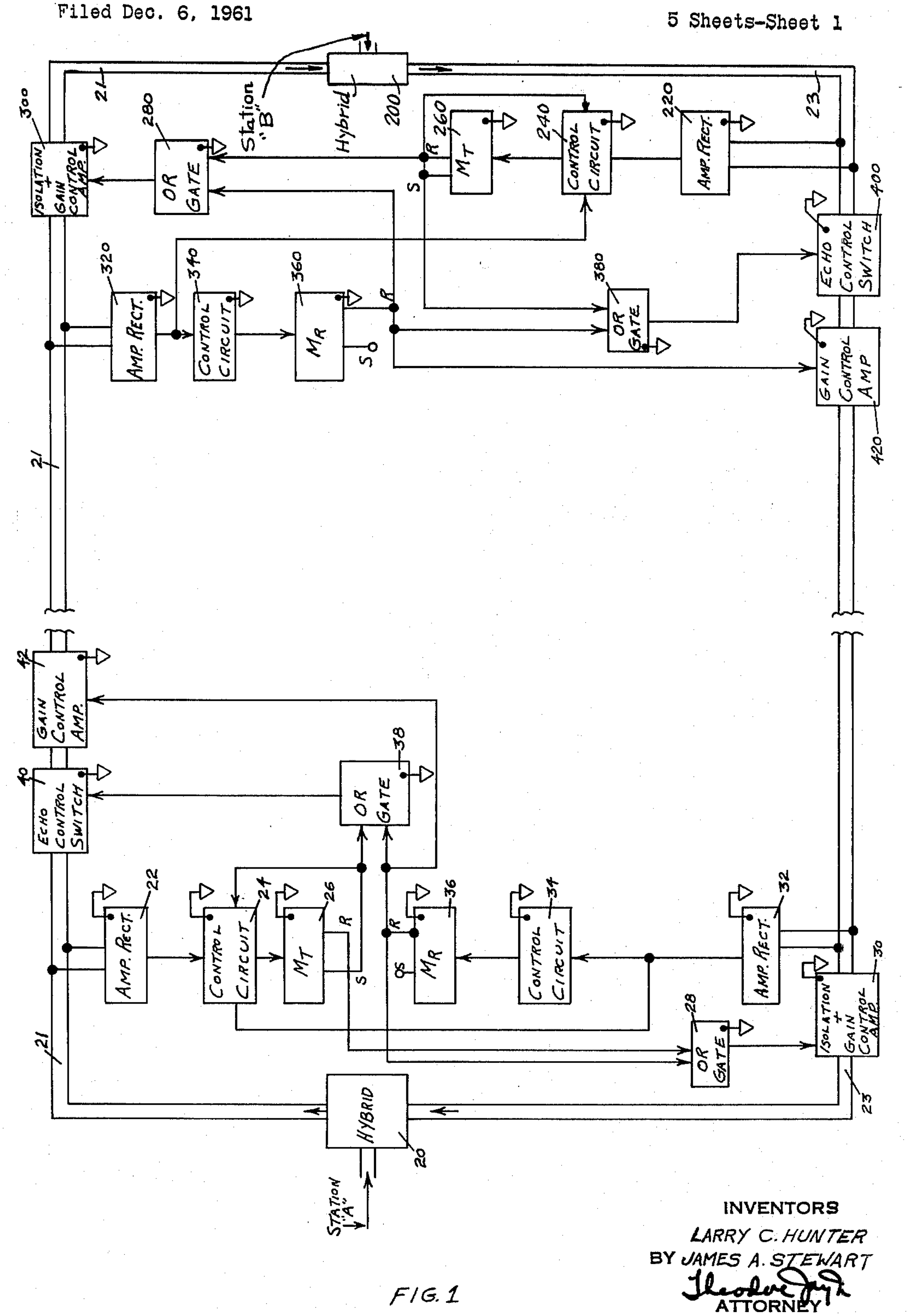

This application is a continuation-in-part of our copending application, Serial No. 91,429 filed February 24, 1961 (now abandoned).

Our invention relates to communication systems, and more particularly relates to communication systems employing echo suppressors.

In certain two-way communication systems wherein two parties positioned at geographically separate locations converse together, as for example in a telephone system, voice signals originated by the first party are transmitted along a first communication channel to the second party, while voice signals originated by the second party are transmitted along a second communication channel to the first party.

Voice signals so produced encounter certain inherent electrical discontinuities which produce reflections. More particularly, when signals originated by one party are transmitted over the appropriate channel to the other party, these reflections are retransmitted over the other channel back to the one party as an echo. When the period of time between the transmission of a signal by one party and the reception of an echo by this party is short, the echo effectively merges with the original signal and goes unnoticed. As the length of this period increases, however, the effect of echo becomes more and more pronounced to a point where conversation is interrupted and even halted completely.

It is known that echoes so produced can be suppressed by using echo suppressors. These suppressors are voice operated devices which, in response to signals travelling along one channel, disable the other channel and thus prevent transmission of echoes.

However, while known suppressors function satisfactorily over relatively short distances of some hundred miles, the extension of telephone transmission to continental and intercontinental distances has created a need for further improvements in echo suppressors. In particular, when known echo suppressors are used with such distances, it has been found that "speech clipping" and "speech chopping" represent highly objectionable design limitations. ("Speech clipping" is defined as the loss of speech at the beginning of a conversation. "Speech chopping" is defined as the loss of syllables resulting from the transfer of control of the suppressors back and forth between talkers.)

We have invented a new type of echo suppressor in which "speech clipping" and "speech chopping" effects are substantially eliminated.

Accordingly it is an object of our invention to eliminate substantially all the undesired effects of "speech chopping" and "speech clipping" in echo suppressors.

Another object is to provide new and improved echo suppressors wherein "speech clipping" and "speech chopping" effects are substantially eliminated.

Still another object is to provide new and improved echo suppressors which utilize only solid state components such as transistors and diodes rather than the relays and the vacuum or gas filled tubes conventionally employed.

These and other objects of our invention will either be explained or will become apparent hereinafter.

In accordance with the principles of our invention, first and second stations separated from each other are interconnected by first and second communication channels. Signals from said first station travel through the first channel to the second station. Similarly signals from the second station travel through the second channel to the first station.

First and second switches positioned adjacent the corresponding first and second stations are inserted in the corresponding first and second channels. Each switch has both a first electrical state in which the corresponding channel is operative and a second and mutually exclusive state in which the corresponding channel is disabled.

Further, first and second devices coupled between the channels are positioned adjacent the first and second stations respectively. The first device places the first switch in the first state when signals are simultaneously present in or absent from both channels, or when signals are present in the first channel and absent from the second channel. In addition, the first device places the first switch in the second state when signals are present in the second channel and absent from the first channel.

Similarly, the second device places the second switch in the first state when signals are simultaneously present in or absent from both channels, or when signals are present in the second channel and absent from the first channel. The second device places the second switch in the second state when signals are present in the first channel and absent from the second channel.

When necessary, first and second amplifying means are inserted in the first and second channels respectively and are so controlled by the first and second devices as to reduce the gain in both channels when signals are present simultaneously in both channels.

Thus, when a party at one station talks and a party at the other station listens, one channel is operative and the other channel is disabled. Consequently, the echoes are completely suppressed. However, when both parties are talking, both channels are operative at reduced gain. Consequently, the echoes are not fully suppressed but are so heavily attenuated in both channels as to be essentially inaudible. (The signal strength is also reduced by the attenuation in one channel. Nevertheless, the reduction in signal level, while noticeable, is not objectionable.)

The system described above is so designed that the presence of echo is detected and the switches are placed in appropriate states with such speed that "speech clipping" effects are no longer noticeable. Moreover, since both channels are operative when both parties are talking together or when one party interrupts another, "speech chopping" effects are eliminated.

Illustrative embodiments of our invention will now be described with reference to the accompanying drawings wherein:

FIG. 1 is a block diagram of a communication system utilizing our invention; and FIGS. 2–10 are schematic diagrams of certain components shown in block form in FIG. 1.

Referring now to FIG. 1, stations A and B are connected through corresponding hybrids 20 and 200 and transmission channels 21 and 23. Signals originating at station A travel over channel 21 to station B. Signals originating at station B travel over channel 23 to station A.

Channel 21 includes an echo control switch 40, a gain control amplifier 42 and an isolation and gain control amplifier 300. Similarly, channel 23 includes an echo control switch 400, a gain control amplifier 420 and an isolation and gain control amplifier 30.

Switch 40 and amplifiers 42 and 30 are controlled by monostable multivibrators 26 and 36 while switches 400 and amplifiers 420 and 300 are controlled by monostable multivibrators 260 and 360. For reasons to be explained below, multivibrators 26 and 260 are controlled by signals transmitted from the stations with which these multivibrators are associated. Thus, these multivibrators 26 and 260 are designated as the transmit multivibrators ($M_T$). Similarly, multivibrators 36 and 360 are controlled by signals received at the stations with which these multivibrators are associated. Consequently, multivibrators 36 and 360 are designated as the receive multivibrators ($M_R$).

Each of the receive multivibrators 36 and 360 has a reset position and a set position. When one of these receive multivibrators is reset, the corresponding pairs of gates 28, 38 or 280, 380 are opened, the corresponding switch 40 or 400 is closed, and the corresponding pairs of amplifiers 30, 42 or 300, 420 are placed in a condition of relatively high gain. When one of these multivibrators is set, it exerts no control over the appropriate gates, switches and amplifiers.

Each of the transmit multivibrators 26 and 260 also has a reset position and a set position. When one of these transmit multivibrators is reset, the corresponding gate 28 or 280 is opened and the corresponding amplifier 30 or 300 is placed in a condition of relatively high gain. When a transmit multivibrator 26 or 260 is set, the corresponding gate 38 or 380 is opened, and the corresponding switch 40 or 400 is closed.

When the system shown in FIG. 1 is in operation but signals are not produced at either station, transmit multivibrators 26 and 260 are reset and receive multivibrators 36 and 360 are reset. Switches 40 and 400 are closed and amplifiers 30, 300, 42 and 420 are all in the relatively high gain condition.

If a party A at station A is to call a party B at station B (i.e., party A talks, while party B listens), the voice signal from station A passes through hybrid 20 and is routed along channel 21 to station B, successively passing through closed switch 40, amplifier 42, amplifier 300 and hybrid 200 to station B. As this signal arrives at amplifier 300, a portion of the signal is fed to amplifier-rectifier 320. In response to this signal, amplifier-rectifier 320 yields a direct voltage which actuates the receive control circuit 340. In turn, circuit 340 triggers multivibrator 360 from the reset to the set position. At the same time, the direct voltage produced by amplifier-rectifier 320 is supplied to the transmit control circuit 240 which raises the "set" threshold in proportion to the strength of the received signal to prevent echoes (which are always weaker than the signal being reflected) from setting transmit multivibrator 260. As a result, switch 400 is open, and amplifier 420 is placed in a condition of relatively low gain. Hence, channel 23 is open and no echoes can be heard by party A. (A portion of party A's signal can leak through hybrid 200 into channel 23 but will not return to party A since switch 400 is open.)

If now party B wishes to talk, while party A listens, the voice signal from station B passes through channel 23 to station A and is blocked from channel 21. More particularly, transmit multivibrators 26 and 260 are respectively reset and set and receive multivibrators 36 and 360 are respectively set and reset. As a result, switch 400 is closed, switch 40 is open, and amplifiers 300, 420 and 30 are in the high gain condition. Since switch 40 is open, leakage signals and echoes cannot be returned to party B.

The operation thus far described with one echo control switch open and the other closed, represents a first mode of operation.

However, when the talker at one station, for example party A, is interrupted by a listener (party B) at the other station by the interjection of a comment or the like, the operation of the system of FIG. 1 changes to a second mode of operation wherein both switches 40 and 400 are closed and amplifiers 30, 300, 42 and 420 are all in the low gain condition. Under these conditions, partial echo suppression is achieved by the loss inserted in each of channels 21 and 23 by the low gain condition of the amplifiers. In particular, each channel suffers the same amount of attenuation. Consequently, echo and leakage signals suffer twice as much loss as the voice signals (for example 24 db vs. 12 db) and become unnoticeable when parties at both stations are talking simultaneously.

This second mode of operation will now be explained in more detail. As has been indicated previously, when party A talks and party B listens, transmit multivibrator 26 and receive multivibrator 360 are both set and receive multivibrator 36 and transmit multivibrator 260 are reset. Under these conditions, switch 40 is closed, switch 400 is open, amplifiers 30, 300 and 442 are in the high gain condition and amplifier 420 is in the low gain condition.

Under these conditions, when party B wishes to interrupt, party B's voice signal passes through hybrid 200 and is supplied to amplifier-rectifier 220. Rectifier 220 then produces a direct voltage, which (providing the magnitude exceeds a predetermined value as explained in more detail hereinafter) actuates the transmit control circuit 240 and thus triggers transmit multivibrator 260 from the reset to the set position. This action closes switch 400 and places amplifier 300 in the low gain condition and party B's voice signal passes through amplifiers 420 and 30 (with the attenuation previously described) and hybrid 20 to station A. A portion of B's voice signal is also supplied to amplifier-rectifier 32. Rectifier 32 then produces a direct voltage which actuates receive control circuit 34 and triggers receive mutivibrator 36 from the reset to the set position. This action places amplifier 30 and 42 in the low gain condition while holding switch 40 closed, thus completing the sequence required for the second mode of operation.

Should one party then become silent, the system will be returned automatically to the first mode of operation. For example, if party B should stop talking, multivibrator 260 will return to the reset position, switch 400 will open and amplifier 300 will be returned to the high gain condition. Further, multivibrator 36 will return from the set to the reset position thus placing amplifiers 30 and 42 in the high gain condition to complete the sequence.

When the system described above is to function without the variable gain feature, gates 28 and 280 and amplifiers 42 and 420 can be eliminated while amplifiers 30 and 300 should then be modified to be conventional fixed gain amplifiers.

Figure 2:
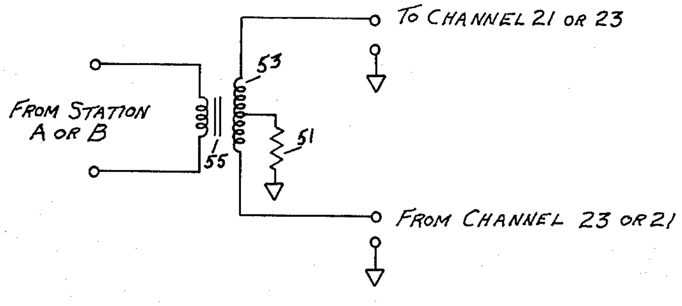
Figure 3:
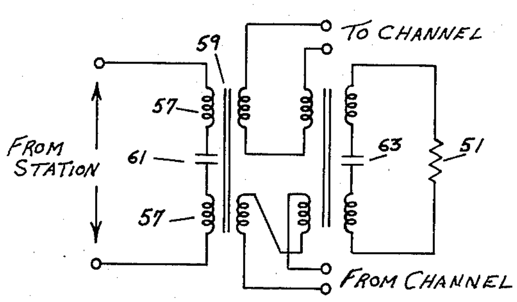

Two alternate forms of the hybrids 20 and 200 are shown in FIGS. 2 and 3. FIG. 2 shows a differential hybrid generally employed when the hybrid is located on the same rack of electronic gear as the appropriate echo suppressor. With the arrangement shown, a voltage applied to the terminals connected to one channel, for example channel 23, will produce essentially no voltage across the terminals connected to the other channel, for example channel 21, since the voltage across the balance resistor 51 is equal in magnitude and opposed in phase to that induced across winding 53 of transformer 55. (These voltages are in series and cancel, but, as indicated previously, there can be a small amount of leakage.)

FIG. 3 shows a composite hybrid which functions in the same manner as that of FIG. 2 but can be used in positions remote from the appropriate suppressor. The split primary winding 57 of transformer 59 and capacitor 61 are employed to prevent direct currents used for signaling from passing through the hybrid coils. Voltage cancellations occur in the same manner as in FIG. 2. However, the balance resistor 51 and capacitor 63 must have the same value as the drop terminating resistor in the two wire input (not shown) and capacitor 61 respectively.

Figure 4:
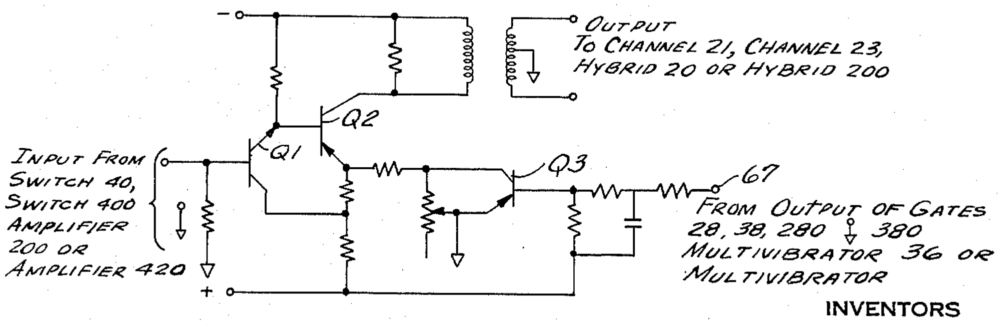

As has been indicated previously, each hybrid produces signals in both channels. In order that the echo suppressor control circuits will function properly, the near talker's signal produced by a hybrid must be blocked or isolated from the receive side by the isolation and control amplifier, i.e. the appropriate one of amplifiers 30 and 300. A circuit for such amplifiers is shown in FIG. 4. It consists primarily of a feedback compound transistor stage (including transistors Q1 and Q2) and a transistor switch (including transistor Q3) for controlling the gain of the stage by introducing emitter degeneration. The gain control is operated by the multivibrator and OR gate connections to terminal 67. Transistors Q1 and Q2 can be replaced by a single transistor. However, frequency response, linearity and isolation are all improved by using two transistors, Q2 being a power transistor and Q1 being a small signal transistor. Amplifiers 42 and 420 can also be of the type shown in FIG. 4.

Figure 5:
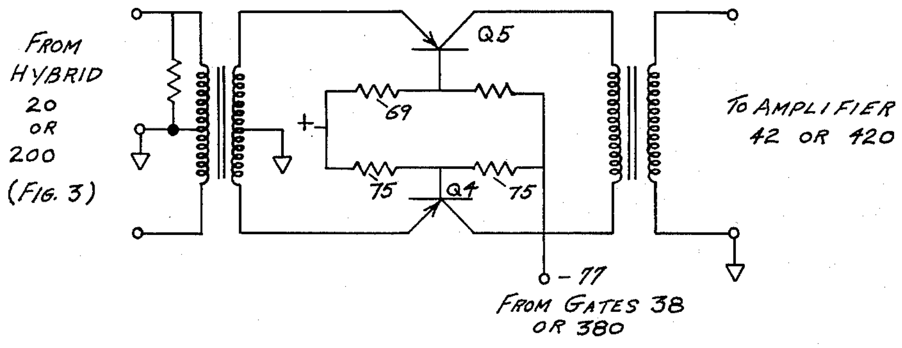

FIG. 5 shows an echo control switch 40 or 400. It employs two transistors Q4 and Q5 which provide balanced switching to eliminate switch clicks. The switch is closed when a control voltage is applied to terminal 77 from the appropriate one of OR gates 38 or 380 to overcome the positive direct voltage bias on the base electrodes of transistors Q4 and Q5 through resistors 69 and 75. In the absence of this control voltage transistors Q4 and Q5 are biased off; since the "off" impedance is several meg ohms, the attenuation of the open switch is greater than 60 db.

Figure 6:
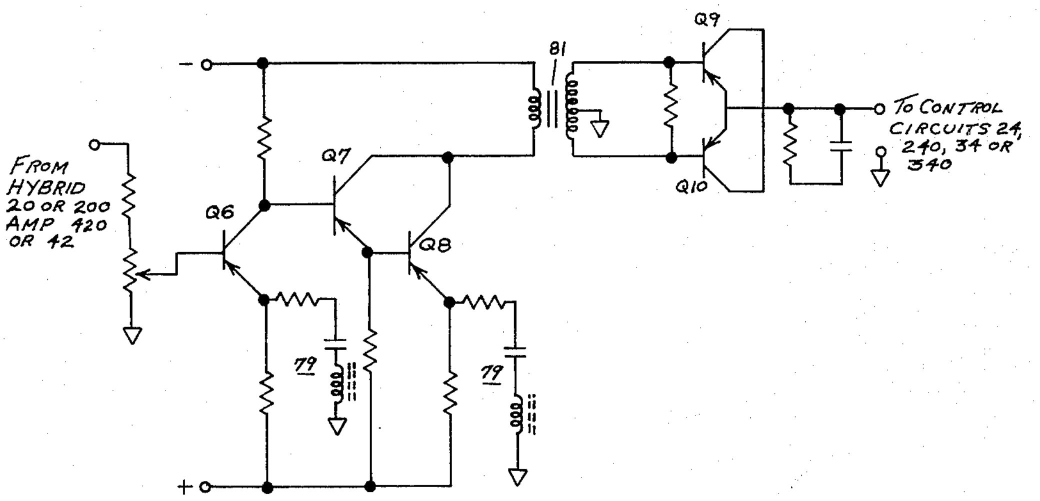

The amplifier-rectifiers 22, 32, 220 and 320 are used to amplify the voice signals and thereafter transform same into direct voltages for operating the appropriate multivibrator. The amplifier-rectifier circuit is shown in FIG. 6. The amplifier portion of the circuit consists of a first transistor stage (transistor Q6) feeding a second transistor stage (transistors Q7 and Q8). Frequency response shaping is obtained by using series resonant networks 79 in series with the emitters of transistors Q6 and Q8. The amplifier signal so produced is fed through transformer 81 to another stage utilizing transistors Q9 and Q10 wherein the amplifier signals are transformed (with power gain) into an appropriately varying direct voltage.

Figure 7:
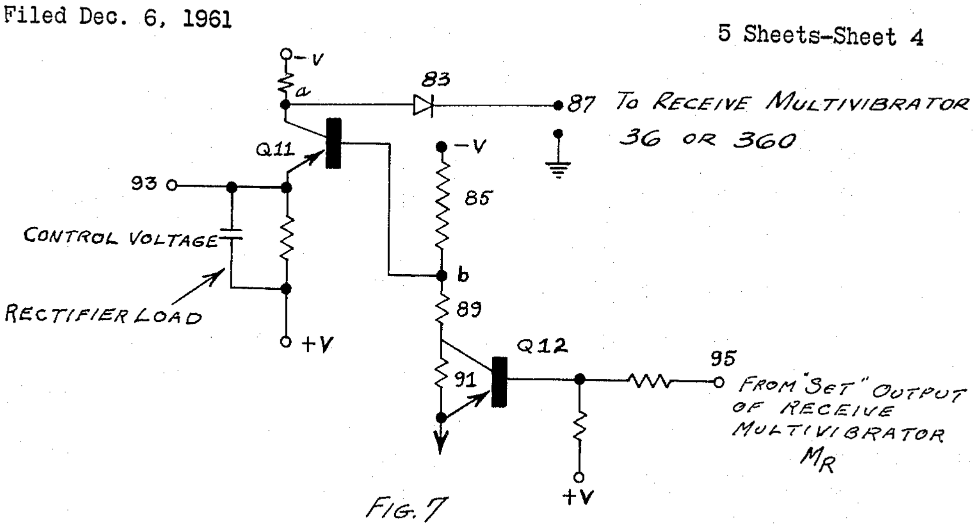

The receive control circuits 34 and 340 responsive to the direct control voltage from the appropriate one of amplifier-rectifiers 32 or 320 can be as shown in FIG. 7. With no control voltage supplied from the amplifier-rectifier transistor Q11 conducts, the voltage at point *a* is lower than the breakdown voltage of zener diode 83 and no output is produced at terminal 87. Resistors 85, 89 and 91 establish a reference voltage at point *b*. When the appropriate amplifier-rectifier supplies a control voltage at terminal 93 and the magnitude of the control voltage exceeds that of the reference voltage at point *b* transistor Q11 is cut off and the emitter current that was drawn by Q11 with no control voltage now flows through the rectifier transistors Q9 and Q10 of FIG. 6. When Q11 stops conducting point *a* rises toward the supply voltage. When it reaches the breakdown voltage of the zener diode 83 an output voltage appears at at terminal 87. The output voltage at 87 sets the receive multivibrator which in turn provides a negative voltage to terminal 95. With no voltage at terminal 95 transistor Q12 is cut off by the positive voltage on its base. The negative voltage causes Q12 to conduct and effectively shorts out the resistor 91. This reduces the reference voltage at point *b*. Thus the "hold" threshold is lower than the "set" threshold, i.e., once the multivibrator is set it will remain set on a lower control signal. This eliminates "motor-boating" for low-level talkers and makes the control more stable.

Figure 8:
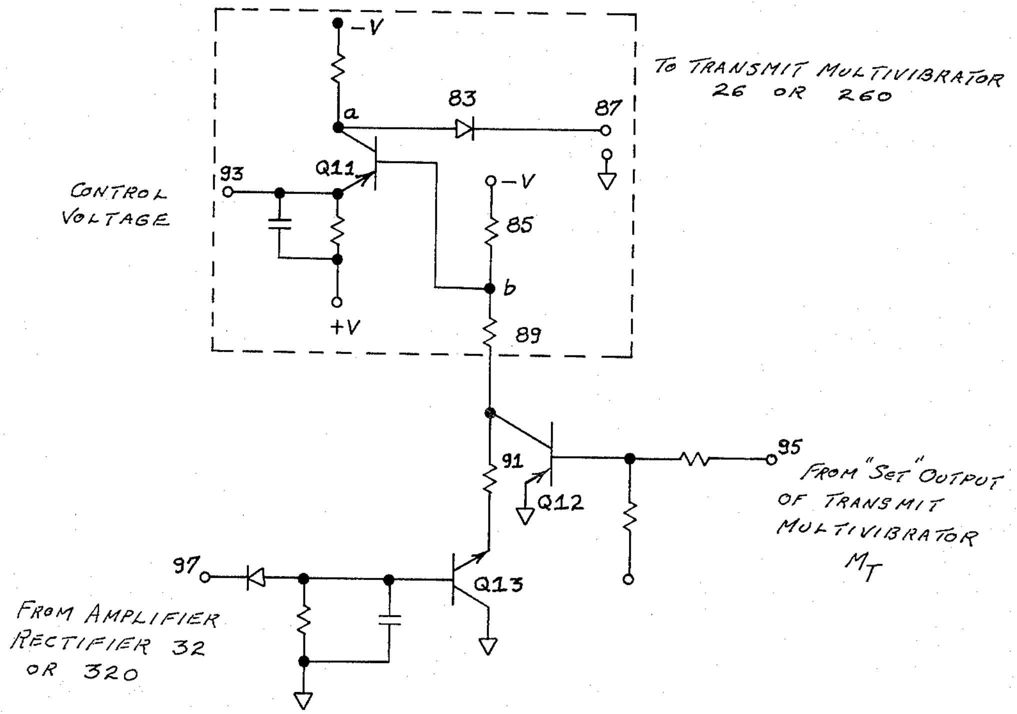

The control circuit 24 and 240 responsive to the direct control voltages from the appropriate one of amplifier-rectifiers 22 or 220 also receive other control voltages as shown in the block diagram of FIG. 1. These circuits can be as shown in FIG. 8. FIG. 8 differs from FIG. 7 only by the addition of Q13 and its associated components. Q13 operates in an "emitter follower" mode, i.e. the emitter cannot go more negative than the base, thus the emitter negative voltage follows the negative potential at terminal 97 (provided Q12 is not conducting) and (assuming a constant current through 85, 89 and 91) the voltage at *b* is proportional to the voltage at 97 within an added constant. This circuit then provides a reference proportional to the received signal to prevent an echo from setting the transmit multivibrator. In FIG. 8 transistor Q12 serves two purposes, namely, to disable the variable threshold control and to fix the "hold" threshold value.

When the signal from the "set" output of $M_T$ is applied to 95, Q12 connects the junction of resistors 89 and 91 to ground thus setting point *b* to a fixed voltage. The emitter of Q13 becomes more positive than the base and Q13 is cut off. The variable reference voltage remains on the base and is available for use at any time that $M_T$ is reset and the suppressor returns to the first mode of operation.

Figure 9:
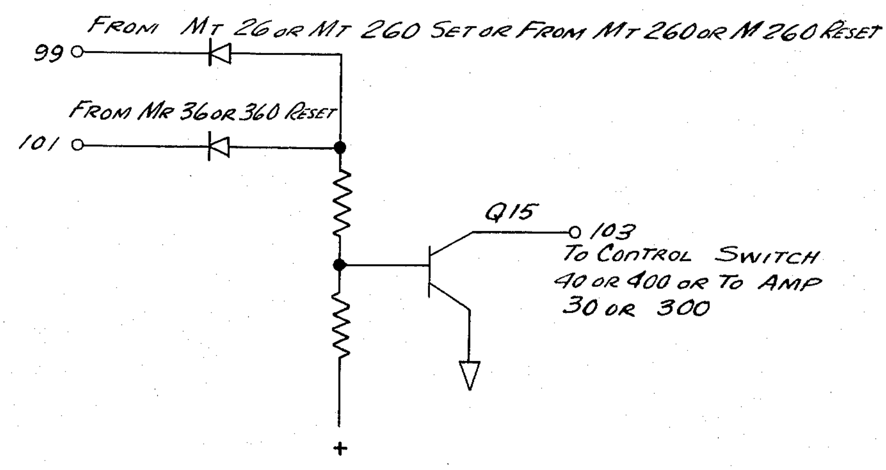

The OR gates 38, 380, 28 and 280 can be as shown in FIG. 9. In FIG. 9 the gate is shown controlling a transistor switch. The inputs to the gates are supplied at terminals 99 and 101. When voltages at both terminals are zero, the base electrode of transistor Q14 goes positive and the transistor is cut off. When at least one negative control voltage appears at one of terminals 99 and 101, the base electrode goes negative, the transistor Q15 conducts heavily, and the switch is closed (output 1). (Note that these gates are of the inclusive OR type, i.e., they respond to the presence of either or both control voltages.) This type of gate is often referred to as a buffer since the diodes de-couple the input sources.

Figure 10:
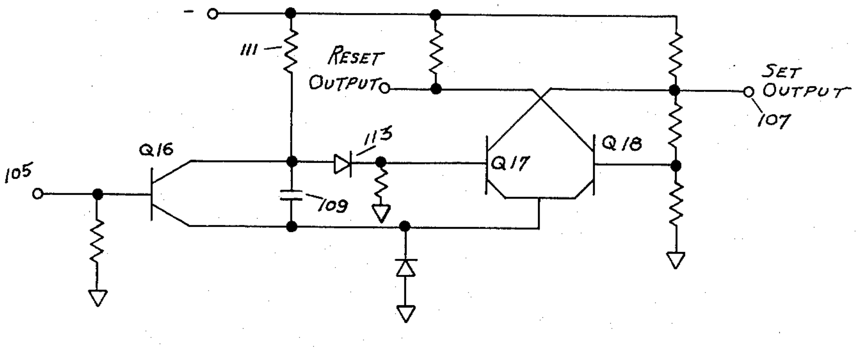

The multivibrators 26, 260, 36 and 360 can be as shown in FIG. 10. The output control voltage from the appropriate one of control circuits 24, 240, 34 and 340 is supplied to terminal 105 and causes transistor Q16 to conduct. Under these conditions, transistor Q18 conducts and transistor Q17 does not, and an appropriate (negative) output voltage appears at the "set" output terminal 107. When the control voltage is absent, transistor Q16 is cut off and capacitor 109 begins to charge through resistor 111. When the voltage on capacitor 109 exceeds the breakdown voltage of zener diode 113, transistor Q17 conducts, transistor Q18 is cut off, and the multivibrator is reset.

The time constants of the multivibrators must be adjusted both to provide the proper hangover periods (to prevent the terminal syllables of a conversation from being heard as echo) and to insure that the switches maintain proper positions during periods between syllables of a conversation [to permit the system to distinguish between normal hesitations in speech and termination of conversation].

The communication channels can each be two wire networks (for purposes of clarity, filters, modulators, repeaters and other conventional equipment are not shown in the drawings). Alternatively, these channels can take the form of conventional microwave or radio links.

While we have shown and pointed out our invention as applied above, it will be apparent to those skilled in the art that many modifications can be made within the scope and sphere of our invention.

What is claimed is:

1. In a communication system wherein first and second physically separated stations are interconnected by first and second communications channels, said first channel passing signals from said first station to said second station, said second channel passing signals from said second station to said first station, (a) first and second switches inserted in said first and second channels respectively and positioned adjacent said first and second stations respectively, each switch having an operative state in which the corresponding channel is operative and a second and mutually exclusive disabled state in which the corresponding channel is disabled;

(b) a first switch control device coupled between said channels and said first switch at said first station, said first device responding to the simultaneous presence of signals in both channels as well as the presence of signals on the first channel combined with the absence of signals in the second channel to supply a first control voltage to said first switch to place same in the operative state, said first device responding to the presence of signals in the second channel combined with the absence of signals in the first channel to supply a second control voltage to said first switch to place same in the disabled state; and (c) a second switch control device coupled between said channels and said second switch at said second station, said second device responding to the simultaneous presence of signals in both channels as well as the presence of signals in the second channel combined with the absence of signals in the first channel to supply a third control voltage to the second switch to place same in the operative state, said second device responding to the presence of signals in the first channel combined with the absence of signals in the second channel to supply a fourth control voltage to said second switch to place same in the disabled state.

2. A communication system as set forth in claim 1 further including a first amplifier stage inserted in series with said first switch in said first channel and a second amplifier stage inserted in series with said second switch in said second channel.

3. A communication system as set forth in claim 2 wherein each of said first and second stages has a high gain mode and a low gain mode.

4. A communication system as set forth in claim 3 wherein said first stage is coupled to said first device and is responsive to said first and second control voltages, said first stage being placed in the high gain mode when said first channel is passing signals from said first station to said second station and signals are absent from said second channel and being placed in the low gain mode when said second channel is passing signals from said second station to said first station, and wherein said second stage is coupled to said second device and is responsive to said third and fourth control voltages, said second stage being placed in the high gain mode when said second channel is passing signals from said second station to said first station and signals are absent from said first station and being placed in the low gain mode when said first channel is passing signals from said first station to said second station.

5. In a communication system wherein first and second physically separated stations are interconnected by first and second communication channels, said first channel passing signals from said first station to said second station, said second channel passing signals from said second station to said first station, (a) first, second, third and fourth amplifier stages, each stage having high and low gain modes, said first and third stages being inserted in said first channel adjacent said first and second stations respectively, said second and fourth stages being inserted in said second channel adjacent said second and first stages respectively, (b) first and second switches inserted in said first and second channels respectively in series with the appropriate ones of said stages and positioned adjacent said first and second stations respectively, each switch having an operative state in which the corresponding channel is operative and a second and mutually exclusive disabled state in which the corresponding channel is disabled, (c) a first switch control device at said first station coupled between said channels and said first switch and said first and fourth stages, said first device, in response to the presence and absence of signals in both channels, supplying control voltages to said first switch and said first and fourth stage modes whereby when signals are present in both channels simultaneously, said first switch is in the operative state and said first and fourth stages are in the low gain mode; when signals are simultaneously absent from both channels, said first switch is in the operative state and said first and fourth stages are in the high gain mode; when signals are simultaneously present in the first channel and absent from said second channel, said first switch is in the operative state, said first and fourth stages are in the high gain mode; when signals are absent from said first channel and simultaneously present in the second channel, said first switch is in the disabled state, said first stage is in the low gain mode and said fourth stage is in the high gain mode, and (d) a second switch control device at said second station coupled between said channels and said second switch and said second and third stages, said second device, in response to the presence and absence of signals in both channels, supplying control voltages to said second switch and said second and third stages to control the second switch state and the second and third stage modes whereby when signals are simultaneously present in both channels, said second switch is in the operative state and said second and third stages are in the low gain mode; when signals are simultaneously absent from both channels, said second switch is in the operative state and said second and third stages are in the high gain mode; when signals are simultaneously present in the first channel and absent from said second channel, said second switch is in the disabled state, said second stage is in the low gain mode and said third stage is in the high gain mode; and when signals are absent from the first channel and simultaneously present in said second channel, said second switch is in the operative state, said second and third stages are in the high gain mode.

References Cited by the Examiner

UNITED STATES PATENTS 2,251,028 7/41 Barney ............. 179—170.2

ROBERT H. ROSE, *Primary Examiner.*

WALTER L. LYNDE, *Examiner.*